United States Patent [19]
Valls

[11] Patent Number: 5,215,196
[45] Date of Patent: Jun. 1, 1993

[54] DEVICE FOR SEPARATING POPCORN FROM UNPOPPED KERNELS

[76] Inventor: Adam M. Valls, R.D. #8, Port Rd., Binghamton, N.Y. 13901

[21] Appl. No.: 815,808

[22] Filed: Dec. 30, 1991

[51] Int. Cl.⁵ .............................................. B07B 1/49
[52] U.S. Cl. .................................. 209/417; 209/370; 209/680; 426/115; 426/124; 99/323.5
[58] Field of Search ............... 209/235, 370, 417, 614, 209/659, 680; 99/323.4, 323.5, 323.11; 426/107, 112, 115, 124

[56] References Cited

U.S. PATENT DOCUMENTS

| | | | |
|---|---|---|---|
| 1,057,129 | 3/1913 | Dutton | 209/417 X |
| 1,522,445 | 1/1925 | Guyot | 209/680 X |
| 4,503,559 | 3/1985 | Warnke | 209/680 X |
| 4,532,397 | 7/1985 | McClelland | 99/323.5 X |
| 4,889,619 | 12/1989 | Lynch | 426/124 X |
| 4,963,374 | 10/1990 | Brandel et al. | 426/115 X |

FOREIGN PATENT DOCUMENTS

| | | | |
|---|---|---|---|
| 0211392 | 2/1924 | United Kingdom | 209/370 |
| 1413144 | 11/1975 | United Kingdom | 209/417 |

Primary Examiner—Joseph E. Valenza
Assistant Examiner—Tuan N. Nguyen
Attorney, Agent, or Firm—Salzman & Levy

[57] ABSTRACT

A device is described that includes a compartment for receiving the popped popcorn after it is popped, which will include unpopped kernels, shells and related debris. The compartment has an open top with a separate lid as a cover and a bottom in which is formed openings of a particular size that will prevent the popped popcorn from passing through while permitting unpopped kernels, and the like, to pass through readily.

10 Claims, 4 Drawing Sheets

DEVICE FOR SEPARATING POPCORN FROM UNPOPPED KERNELS

BACKGROUND OF THE INVENTION

Field of the Invention

The present invention relates to specialty implements and, more particularly, to a device with the unique purpose of providing automatic separation of popcorn from any kernels that may remain unpopped.

It is well known that all popcorn seeds, when heated, do not produce "popcorn", but rather, the kernels that remain after heat is applied are hard, unchewable, tasteless and a real hazard to an unsuspecting individual's teeth. The only prior successful defense to this hazard is the exercise of care to avoid these kernels, which is not so easily accomplished when eating popcorn in a darkened room while watching television or in a dimly lit movie theater or even in broad daylight during the excitement of a sporting event.

While the hazard has been long known, a solution has not been developed, until the present invention. It is a problem not too unlike the very real hazard of encountering a bone while eating fish. In that activity, the present invention may not offer much comfort, but during the act of eating popcorn the present invention offers a solution to an otherwise tooth-shattering experience.

SUMMARY OF THE INVENTION

It is a principal object of the present invention to provide a device for separating popcorn that has been popped from unpopped kernels and other similar debris.

Another object of the invention is to provide a structure for a device to accomplish a separation of popped popcorn from unpopped kernels and the like.

Yet another object of the present invention is to provide a device to separate popped popcorn from unpopped kernels and the like automatically.

Briefly, a device that is constructed and arranged in accordance with the principles of the invention will accomplish the desired separation efficiently and reliably. In its broadest aspects, the invention provides a compartment that has an open top and a bottom. The bottom of the compartment has a plurality of openings arranged in a predetermined pattern, the openings being of a predetermined size and configuration.

With this arrangement, after popping, is poured into the compartment, and the compartment is shaken vigorously only for a second or two. The larger popcorn that has popped rises to the top, and the unpopped kernels go to the bottom where they fall through the openings and can be disposed of as they fall through.

The popcorn that remains in the compartment is consumed safely and as ravenously as one's diet, appetite or inclination may dictate.

These and other objects, features and advantages of the invention will become more readily apparent from the following detailed description of the presently preferred embodiment when taken in conjunction with the accompanying drawings.

DETAILED DESCRIPTION OF THE INVENTION

Figure 1:
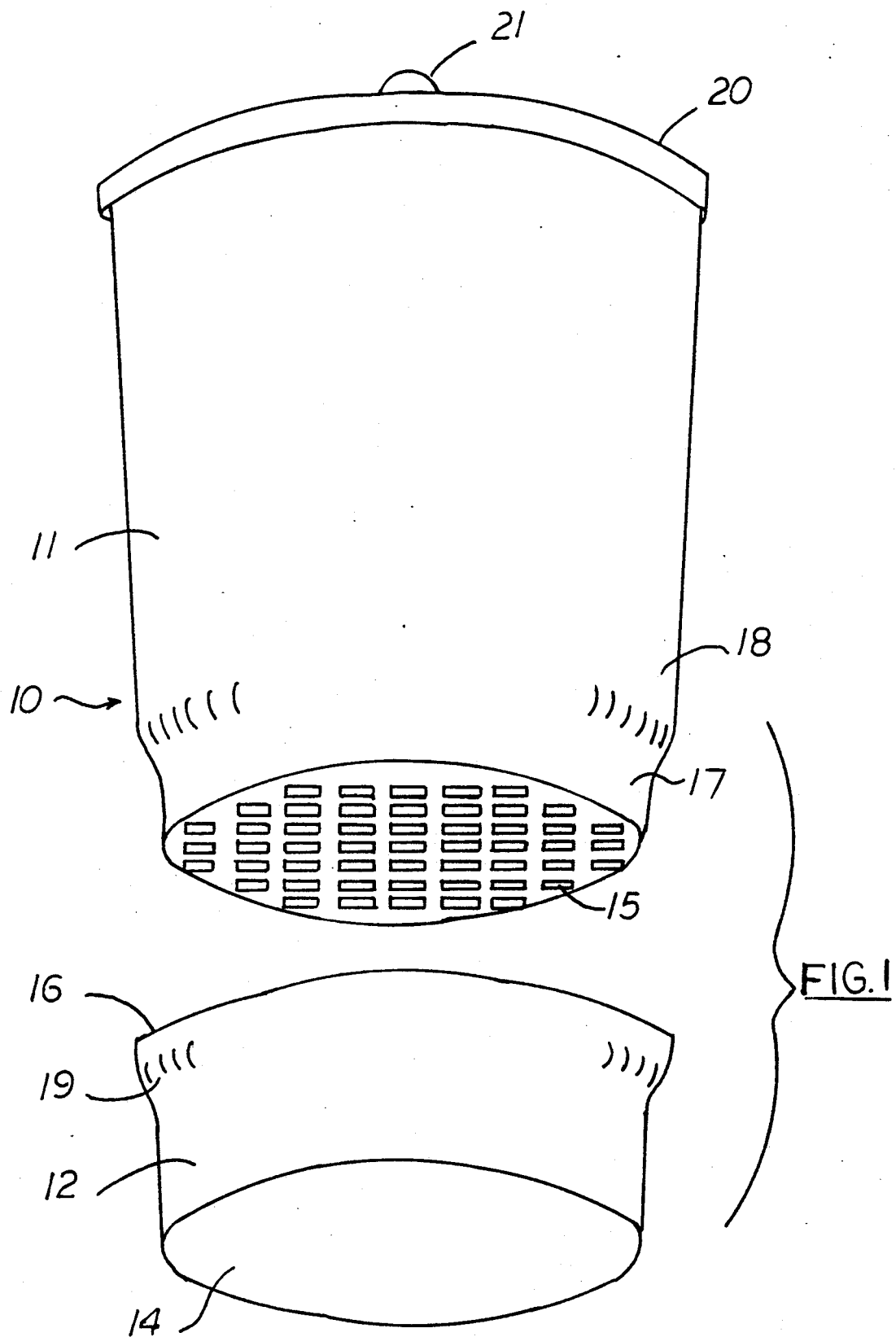
FIG. 1 is a view in perspective of a device, implement or structure that is arranged in accordance with the invention.

In FIG. 1 of the drawings, the reference numeral 10 identifies the overall device of a presently preferred form of the invention. The device 10 consists of an upper container or compartment 11 and a lower compartment 12.

The upper compartment 11 has a bottom 13, and the lower compartment 12 has a bottom 14. The bottom 14 is solid, but the bottom 13 is formed with a plurality of openings 15 that are important to the successful functioning of the device of the invention.

The parameters of the openings 15 may vary, according to the invention, but they have certain limitations. For example, the shape of the openings 15 and their pattern may vary according to the whim or wish of the manufacturer and may be dictated by such considerations as sales or marketing factors.

However, the size of each opening is limited by a dimension that will prevent a popped popcorn from passing through. While the size of a single popped popcorn may vary, a size for each opening 15 that will prevent almost all such popped popcorn from passing through is $\frac{3}{8}$".

Another dimension for each opening 15 that can be important to successful functioning of the device 10 is the smaller dimension. That dimension is at least as large as a kernel of unpopped popcorn, which is approximately 1/6".

Therefore, since the size of each opening 15 may vary between 3/16" and $\frac{1}{4}$", according to the invention, it is recommended that $\frac{1}{4}$" be the size of the openings 15.

As described above, the shape of the openings 15 may vary widely, but two shapes are presently preferred. Slots, such as illustrated in FIG. 1 of the drawings, may be any desired length but limited in width to approximately $\frac{1}{4}$", as described above.

Also, the arrangement of the slots can vary, depending upon such factors as manufacturing requirements, sales and marketing preferences and the desire of an individual in the decision making position. The particular arrangement in this view of the drawings, however, is entirely satisfactory for an effective functioning of the arrangement of the present invention.

Figure 2:
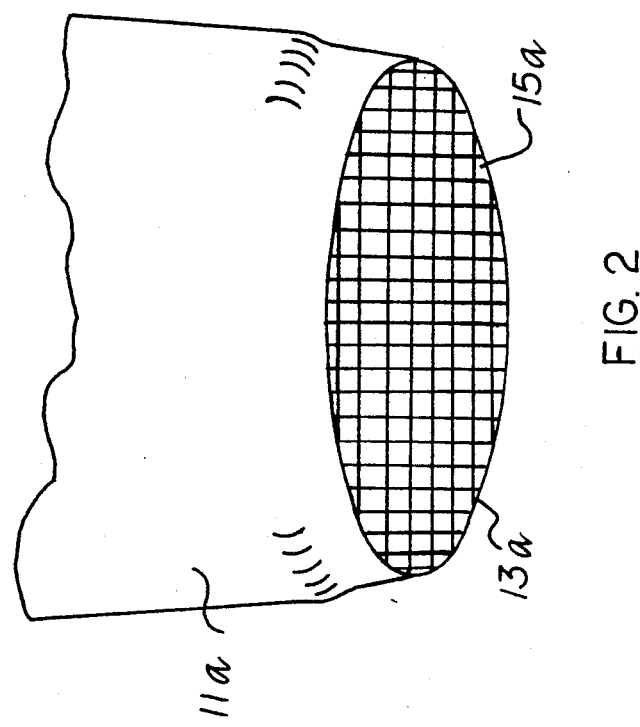
FIG. 2 is a view in perspective of the lower half of the upper compartment illustrating a modification of the invention.

A second shape of the openings 15 that is preferred is illustrated in FIG. 2 of the drawings by the reference numeral 15a which is approximately a square arrangement, although any rectilinear configuration would be suitable. As shown in this view, the openings 15a at the bottom 13a of the upper compartment 11a are approximately $\frac{1}{4}$" square, but as described above, these dimensions may vary to a rectangle of approximately 3/16" by $\frac{3}{8}$" inch and still function effectively for the purpose of preventing popped popcorn from passing through while permitting unpopped kernels to pass through readily.

While it is contemplated that the majority of instances of use of the device of the invention will be in an environment where disposal of such debris as unpopped kernels is inconvenient, such as inside the home in the living room or den where a fireplace is used to pop the popcorn while watching television, the lower compartment 12, FIG. 1, permits the unpopped kernels to be collected and retained until they can be disposed at a more convenient time.

The lower compartment 12 is of a shape to substantially match that of the upper compartment 11 but with a much shorter depth, since it will retain only seeds and unpopped kernels of popcorn, and the like. The top 16 of the lower compartment 12 is open to fit snugly about a part of the upper compartment 11.

Since the upper compartment 11 should be shaken briefly to separate the popped popcorn from unpopped kernels, the upper compartment 11, in this form of the invention, is tapered slightly in a downward direction with the lower 10–20%, identified by the reference numeral 17, of its total height recessed even further below a tapered portion 18.

Now, with a matching section 19 about the open end 16 of the lower compartment 12 flared as shown, the lower compartment 12 fits up snugly about the upper compartment 11 against the tapered portion 18 providing a single, unitary structure for the device 10. This arrangement makes the device 10 easier to handle during the interval when it is shaken.

While the depth of the lower compartment 12 is limited to only a relatively small dimension, the depth of the upper compartment 11 is much larger because it will enclose a quantity of popped popcorn. The depth of the upper compartment 11 is contemplated to be at least 6" in the preferred form of the invention, and it can be made deeper for different models of the device 10, while lower compartment 12 need be no more than 1" or 2" deep.

While a cover may not be indicated in some instances of use of the device 10, a lid 20 is formed to fit and cover the open upper end of the upper compartment 11 for the presently preferred form of the invention. A knob 21 is formed integrally with the lid 20 as an aid in handling the cover.

It is contemplated that there will be instances of use of the device 10 when the lid 20 will be unavailable or otherwise will be misplaced, and therefore, the device 10 will be entirely operable by simply placing one open hand over the otherwise open upper end of the upper compartment 11 during the brief interval when it will be shaken.

The material of which the device 10 of the invention is formed can be any that is dictated by other factors, but the preferred form of the device 10 is made of a suitable plastic or other moldable material. In this manner, the openings 15 in the bottom 13 are formed integrally with the upper compartment 11. It should also be understood that lower compartment 12 can be fabricated from paper or other resilient and disposable material, if desired.

In some instances of use of the device 10 of the invention particularly when cost of fabrication is not a factor, it is entirely feasible to form the device 10 of a suitable metallic material, and in such instance, it is contemplated that chrome plated metal will be used.

Also, in some instances of use, it is contemplated that the device 10 will be used without the lower compartment 12. In such an instance, the upper compartment, before it is shaken, should be held over a trash can, over open ground or somewhere where the resulting debris falling through the openings 15 will not create a messy situation or other problems not usually associated with the enjoyment of popcorn.

Figure 3:
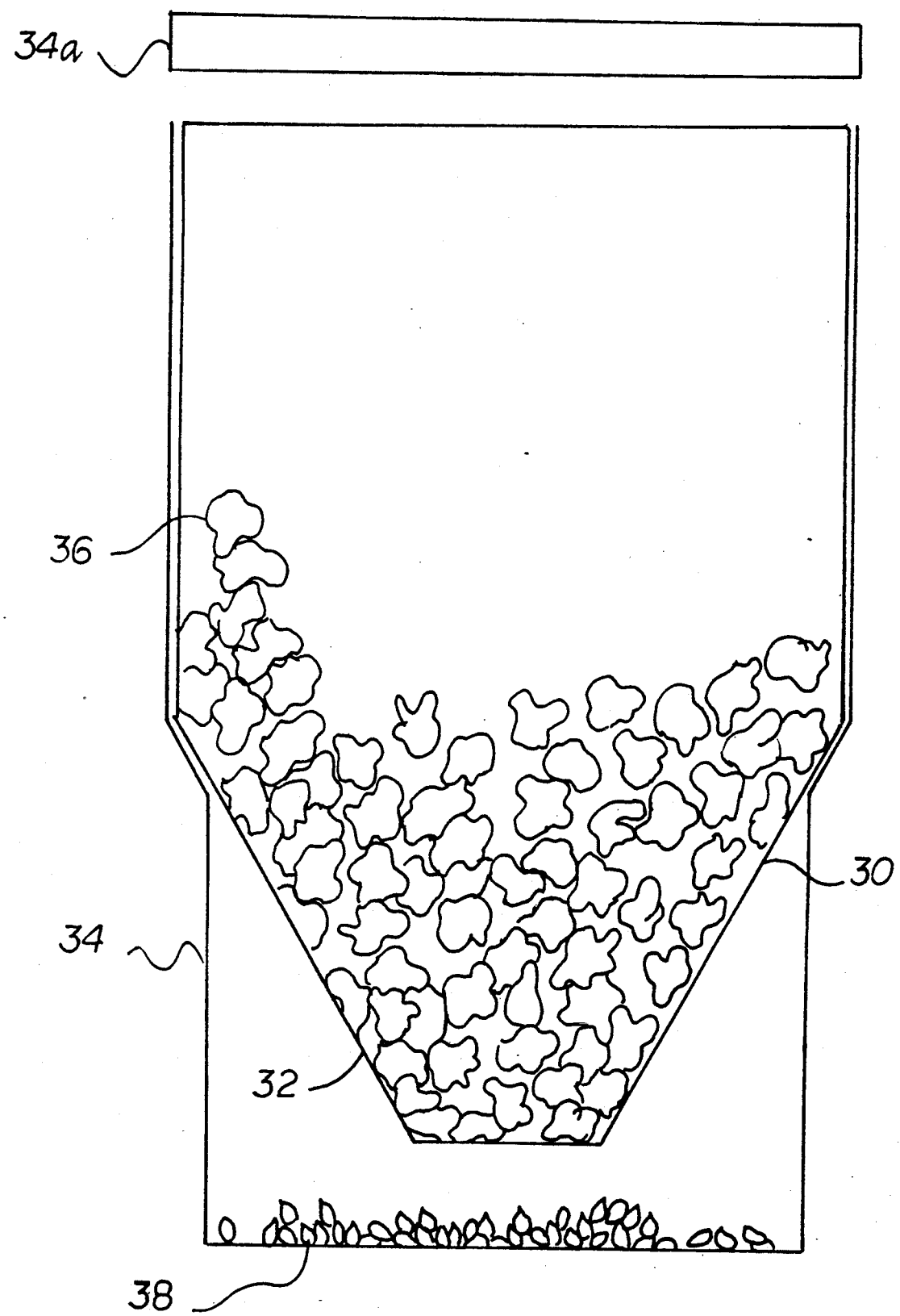
FIG. 3 is a plan view of an alternate embodiment of the present invention in the form of a removable, cone-shaped insert.

Referring now to FIG. 3, there is shown an alternate embodiment of the invention. A removable insert 30 in the form of a frustum has apertures 32 formed therein. The apertures may be any one of a number of shapes approximately $\frac{1}{4}$" in diameter. When the insert 30 is placed in a container 34, such as a cardboard cup as is currently popular in movie theaters, popped popcorn 36 remains in the major portion of the insert 30, while unpopped kernels 38 pas through apertures 32 into the lower portion of the container 34. Agitating the container 34 and insert 30 facilitates the separation of unpopped kernels 38 from popcorn 36. The lower portion of insert 30 may rest on the inside surface of the base of container 34 or may be displaced therefrom, as shown.

Figure 4:
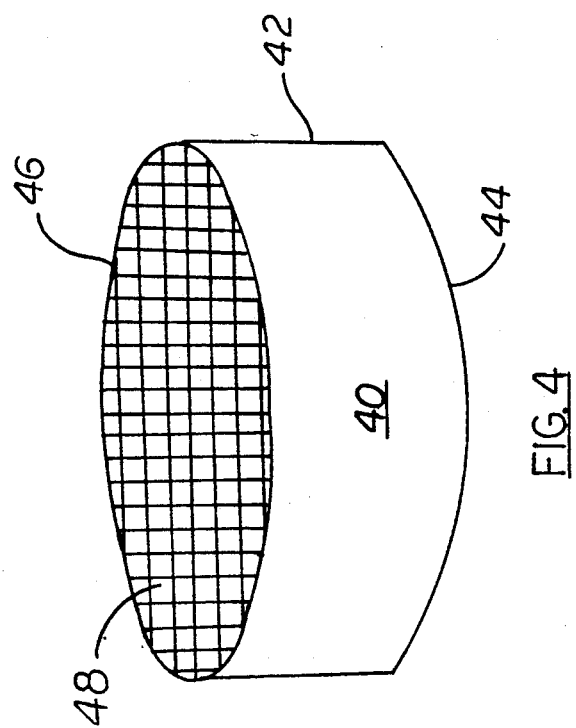
FIG. 4 is a view in perspective of another alternate embodiment of the present invention in the form of a removable container.

Referring now also to FIG. 4, there is shown another embodiment of an insert for use in the present invention. A small container 40 is cylindrically shaped, having a unitary construction of walls 42 and base 44. The upper portion of container 40 has a substantially planar lid 46 with apertures 48 for allowing unpopped kernels, not shown, to pass through from above. Lid 46 may be removable from body of container 40. The unpopped kernels are thus trapped in the body of container 40 for subsequent disposal.

Figure 5:
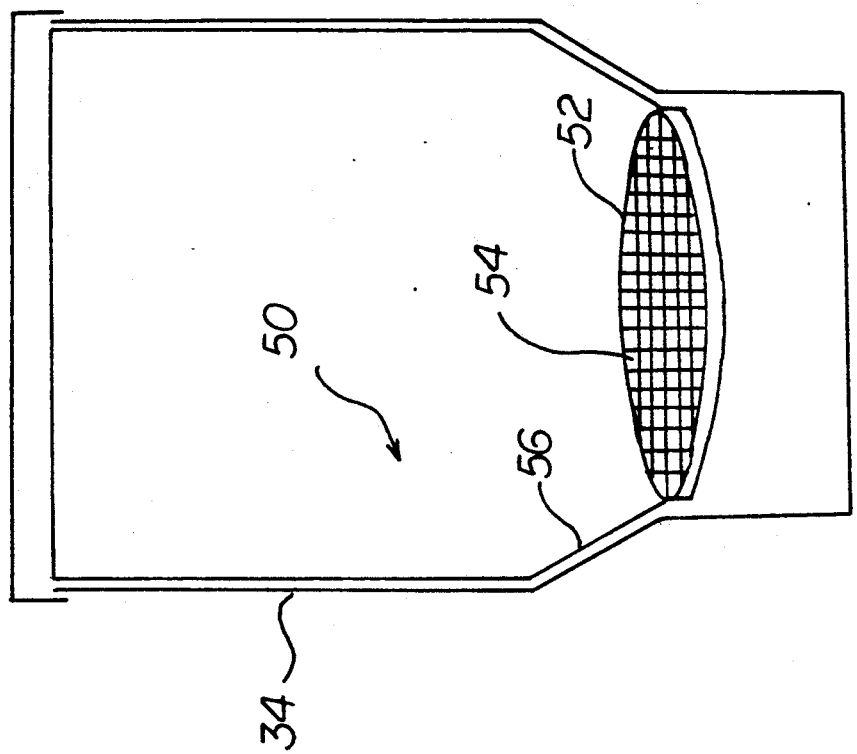
FIG. 5 is a view in perspective of yet another alternate embodiment of the present invention in the form of a removable barrier.

Referring now also to FIG. 5, there is shown yet another embodiment of the present invention. An insert 50 fabricated from cardboard or metal foil has a substantially flat base 52 with apertures 54 therein. The apertures 54 are of an appropriate size to allow unpopped kernels, not shown, to pass through from above. A side wall or lip 56 allows the insert 50 to be placed in a suitable container, such as a cylindrical paper cup 34 (FIG. 3) in such a manner that the base 52 of insert 50 is displaced from the inside lower surface of the cup. In this way, insert 50 can be used to screen and separate unpopped kernels from popcorn. Insert 50 may be discarded along with the paper cup container 34, or may be retained for future use.

While the invention has been described in detail along with various modifications, other and further changes can be made without departing from the true spirit and scope of the invention. Therefore, it is understood that the invention is limited only by the following claims.

What is claimed is:

1. A device for separating popped popcorn from unpopped kernels, comprising:
   first container means formed of a self supporting material for enclosing a predetermined quantity of popped popcorn containing an unknown quantity of unpopped kernels;
   said first container means having an open top formed to a predetermined dimension and a bottom formed smaller than said predetermined dimension;
   said first container means tapering at a predetermined rate a preselected distance downwardly to a point near said bottom, and from said point tapering at an even greater rate to said bottom;
   said bottom having openings arranged in a predetermined pattern and of a predetermined size for separating popped popcorn from unpopped kernels; and second container means having an open top formed to fit over said bottom of said first container means only up to said point;

wherein when said first container means encloses a quantity of popped popcorn and unpopped kernels, said unpopped kernels pass readily through said openings by shaking said first and second container means, after which said second container means may be separated from said first container means, so that the popped popcorn may be enjoyed without the presents of unpopped kernels.

2. A device for separating popped popcorn from unpopped kernels as defined by claim 1 wherein said openings are in the from of slots.

3. A device for separating popped popcorn from unpopped kernels as defined by claim 1 wherein said bottom are circular.

4. A device for separating popped popcorn from unpopped kernels as defined by claim 3 wherein said openings are arranged in a generally linear pattern in said bottom.

5. A device for separating popped popcorn from unpopped kernels as defined by claim 1 wherein said openings are generally rectangular in configuration, and sized to permit unpopped kernels to pass readily through while retaining popped popcorn within said first container means.

6. A device for separating popped popcorn from unpopped kernels as defined by claim 1 including covering means to cover said open top of said first container means.

7. A device for separating popped popcorn from unpopped kernels as defined by claim 1 wherein said second container means has an open top and a closed bottom.

8. A device for separating popped popcorn from unpopped kernels as defined by claim 1 wherein said second container means has an open top with a perimeter flared to fit a matching surface on said first container means, so that said device can be shaken in a unitary manner.

9. A device for separating popped popcorn from unpopped kernels as defined by claim 1 wherein said openings are generally square in configuration, with an open space having a range of 3/16" to ⅜".

10. A device for separating popped popcorn from unpopped kernels as defined by claim 9 including covering means to cover said open top of said first container means.

* * * * *